No. 731,498.

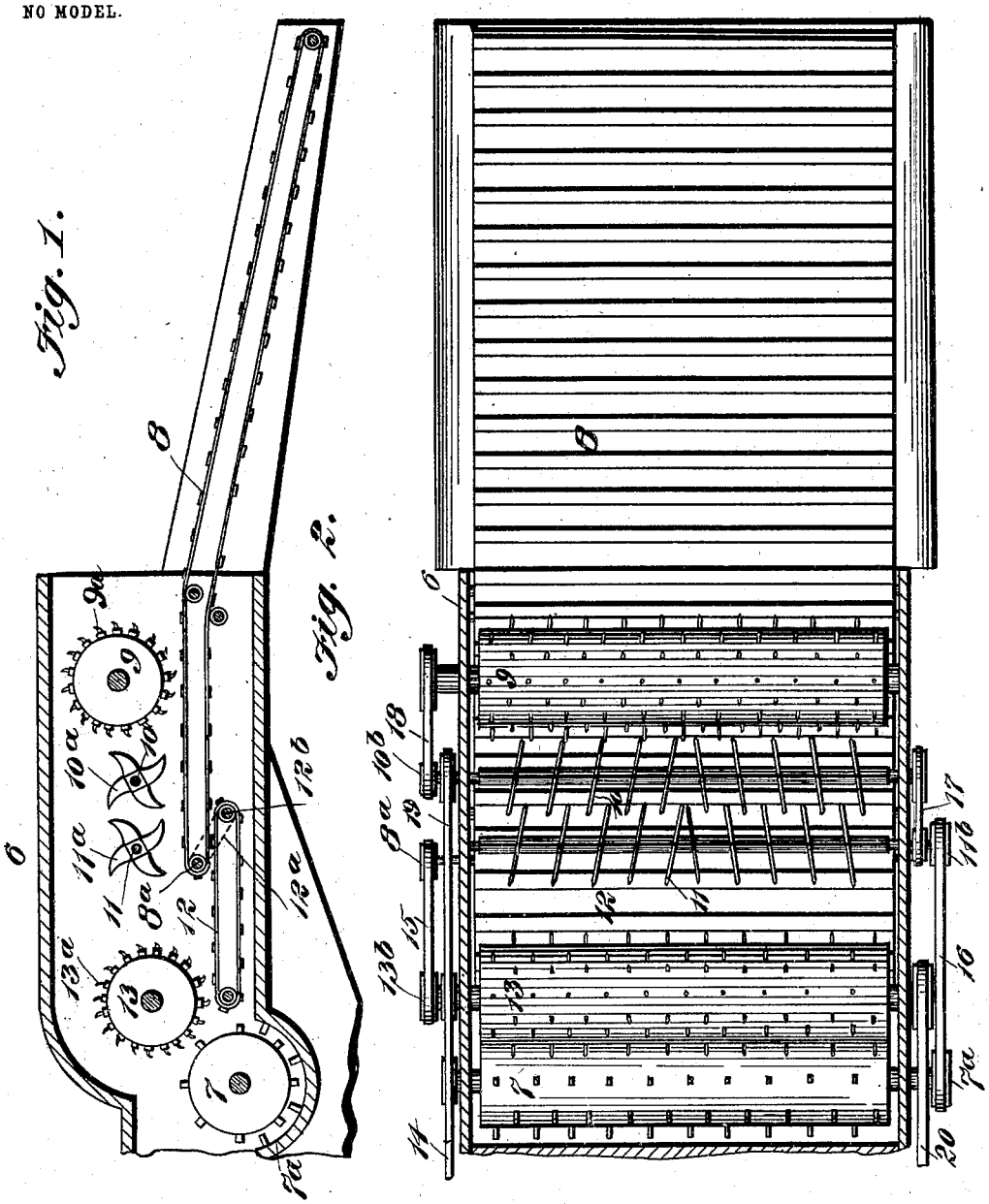

Patented June 23, 1903.

UNITED STATES PATENT OFFICE.

DELOSS RAMSEY, OF JAMESTOWN, KANSAS.

BAND-CUTTER AND FEEDER.

SPECIFICATION forming part of Letters Patent No. 731,498, dated June 23, 1903.

Application filed November 24, 1902. Serial No. 132,604. (No model.)

*To all whom it may concern:*

Be it known that I, DELOSS RAMSEY, a citizen of the United States, residing at Jamestown, in the county of Cloud and State of Kansas, have invented certain new and useful Improvements in Band-Cutters and Feeders; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to improvements in a band-cutter and feeder attachment for threshing-machines, and has for its object a simple and efficient device for cutting the bands and spreading out and evenly feeding the straw to the threshing-cylinder.

In the accompanying drawings, Figure 1 is a central vertical section of so much of a threshing-machine as is necessary to illustrate my invention. Fig. 2 is a plan view thereof.

Referring specifically to the drawings, 6 designates the feed-box casing, 7 the threshing-cylinder, and $7^a$ the concave. The bundles of grain are fed into the machine by a conveyer 8 and pass under a cylinder 9, provided with knives $9^a$. This cylinder revolves comparatively slow and draws in and holds the straw while the bands are being cut by the band-cutter 10. A second band-cutter 11, running at a greater speed than the cutter 10, draws the straw from the latter and delivers it to a conveyer 12. It also cuts any bands that may have escaped the first cutter. The band-cutter knives $10^a$ and $11^a$ are set obliquely to the axis of the shaft and incline oppositely from the middle toward each end, which has the effect of spreading the straw after the bands are cut.

By the conveyer 12 the straw is carried to the threshing-cylinder 7. Before it passes to the same it is further spread out by the knives $13^a$, carried by a cylinder 13. The speed of this cylinder is less than that of the threshing-cylinder, and it feeds the straw evenly by combing or spreading it out, and thus preventing clogging.

Rotation to the various parts above described is conveyed by the following means; but the particular means here shown are immaterial and may be changed to any other desirable driving means.

The shaft $13^b$ of the cylinder 13 is driven by a belt 14 from the beater. (Not shown.) From this shaft a belt 15 connects with the shaft $8^a$ of the conveyer 8 and drives the same. A chain $12^a$ runs from the shaft $8^a$ to the shaft $12^b$ of the conveyer 12 and drives the same. A belt 16 connects the shaft $7^a$ of the cylinder 7 with the shaft $11^b$ of the band-cutter 11, which in turn is connected by a belt 17 to the band-cutter 10. The cylinder 9 is driven by a belt 18 from the band-cutter 10. The shaft $10^b$ of the band-cutter 10 and the shaft of the beater (not shown) are connected by a belt 19. The main drive-belt 20 is connected to the shaft $13^b$. It is to be understood that the sizes of the pulleys, or sprockets if chain gearing is used, vary so as to give the proper speed to the several parts.

Having thus described my invention, what is claimed as new, and desired to be secured by Letters Patent, is—

1. In a threshing-machine, the combination with the threshing-cylinder and a conveyer, of a series of band-cutters rotating at successively greater speeds, a feeding-cylinder rotating slower than the cutters for holding the straw while the bands are cut, and a combing and spreading cylinder carrying knives and located behind the cutters in a plane above that of the threshing-cylinder, substantially as described.

2. In a threshing-machine, the combination with the threshing-cylinder and a conveyer, of a series of band-cutters rotating at successively greater speeds, and having knives set obliquely to the shaft, a feeding-cylinder rotating slower than the cutters for holding the straw while the bands are cut, a conveyer for carrying the straw from the band-cutters to the threshing-cylinder, a combing and spreading cylinder carrying knives and located above said conveyer and in close proximity to and having a lesser speed rotation than the threshing-cylinder, substantially as described.

In testimony whereof I affix my signature in presence of two witnesses.

DELOSS RAMSEY.

Witnesses:
JOHN KELLY,
ED PRATT.